US007998246B2

(12) United States Patent
Liu et al.

(10) Patent No.: US 7,998,246 B2
(45) Date of Patent: *Aug. 16, 2011

(54) GAS SEPARATIONS USING HIGH PERFORMANCE MIXED MATRIX MEMBRANES

(75) Inventors: Chunoing Liu, Schaumburg, IL (US); Man-Wing Tang, Cerritos, CA (US); Stephen T. Wilson, Libertyville, IL (US); David A. Lesch, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 658 days.

This patent is subject to a terminal disclaimer.

(21) Appl. No.: 11/612,388

(22) Filed: Dec. 18, 2006

(65) Prior Publication Data

US 2008/0141858 A1  Jun. 19, 2008

(51) Int. Cl.
    *B01D 53/22* (2006.01)
(52) U.S. Cl. ............. 95/45; 95/43; 95/47; 96/4; 96/14
(58) Field of Classification Search ............. 95/43, 45, 95/47; 96/4, 14
    See application file for complete search history.

(56) References Cited

U.S. PATENT DOCUMENTS

| 3,567,632 | A | 3/1971 | Richter et al. | 210/23 |
| 4,230,463 | A | 10/1980 | Henis et al. | 55/16 |
| 4,705,540 | A | 11/1987 | Hayes et al. | 55/16 |
| 4,728,345 | A | 3/1988 | Murphy | 55/158 |
| 4,740,219 | A | 4/1988 | Kulprathipanja et al. | 155/16 |
| 4,880,442 | A | 11/1989 | Hayes et al. | 55/16 |
| 4,925,459 | A | 5/1990 | Rojey et al. | 155/16 |
| 4,925,562 | A | 5/1990 | te Hennepe et al. | 210/500.25 |
| 5,085,676 | A | 2/1992 | Ekiner et al. | 55/158 |
| 5,104,532 | A | 4/1992 | Thompson et al. | 210/224 |
| 5,127,925 | A | 7/1992 | Kulprathipanja et al. | 55/16 |
| 5,288,304 | A | 2/1994 | Koros et al. | 95/45 |
| 5,431,864 | A | 7/1995 | Rao et al. | 264/29.5 |
| 5,447,559 | A | 9/1995 | Rao et al. | 96/4 |
| 5,507,856 | A | 4/1996 | Rao et al. | 95/50 |
| 5,538,536 | A | 7/1996 | Fuentes et al. | 95/45 |
| 6,048,388 | A | 4/2000 | Schwarz | 106/31.27 |
| 6,248,682 | B1 | 6/2001 | Thompson et al. | 502/4 |
| 6,500,233 | B1 | 12/2002 | Miller et al. | 95/50 |
| 6,503,295 | B1 | 1/2003 | Koros et al. | 95/51 |
| 6,508,860 | B1 | 1/2003 | Kulkarni et al. | 95/51 |
| 6,562,110 | B2 | 5/2003 | Koros et al. | 96/4 |
| 6,579,343 | B2 | 6/2003 | Brennecke et al. | 95/51 |
| 6,585,802 | B2 | 7/2003 | Koros et al. | 95/51 |
| 6,605,140 | B2 | 8/2003 | Fuiver et al. | 96/4 |
| 6,626,980 | B2 | 9/2003 | Hasse et al. | 95/51 |
| 6,663,805 | B1 | 12/2003 | Ekiner et al. | 264/45.9 |
| 6,726,744 | B2 | 4/2004 | Kulprathipanja et al. | 95/45 |
| 6,740,143 | B2 | 5/2004 | Corbin et al. | 96/11 |
| 6,755,900 | B2 | 6/2004 | Koros et al. | 96/10 |
| 6,863,983 | B2 | 3/2005 | Tsapatsis et al. | 428/446 |
| 6,932,859 | B2 | 8/2005 | Koros et al. | 96/10 |
| 6,946,015 | B2 | 9/2005 | Jorgensen et al. | 95/51 |
| 6,997,971 | B1 | 2/2006 | Young et al. | 95/45 |
| 7,025,804 | B2 | 4/2006 | Simmons et al. | 95/51 |
| 7,109,140 | B2 | 9/2006 | Marand et al. | 502/4 |
| 7,138,006 | B2 | 11/2006 | Miller et al. | 95/45 |
| 7,166,146 | B2 | 1/2007 | Miller et al. | 95/45 |
| 2002/0053284 | A1 | 5/2002 | Koros et al. | 95/51 |
| 2003/0220188 | A1 | 11/2003 | Marand et al. | 502/60 |
| 2004/0107830 | A1 | 6/2004 | Simmons et al. | 95/45 |
| 2004/0147796 | A1 | 7/2004 | Roman et al. | 585/144 |
| 2005/0043167 | A1 | 2/2005 | Miller et al. | 502/4 |
| 2005/0139066 | A1 | 6/2005 | Miller et al. | 95/45 |
| 2005/0230305 | A1 | 10/2005 | Kulkarni et al. | 210/500.23 |
| 2005/0268782 | A1 | 12/2005 | Kulkarni et al. | 96/4 |
| 2006/0107830 | A1 | 5/2006 | Miller et al. | 95/45 |
| 2006/0117949 | A1 | 6/2006 | Kulkarni et al. | 95/45 |
| 2007/0022877 | A1 | 2/2007 | Marand et al. | 95/51 |
| 2008/0142440 | A1* | 6/2008 | Liu et al. | 210/640 |

FOREIGN PATENT DOCUMENTS

| EP | 1188477 | 3/2002 |
| WO | WO 99/18055 | 4/1999 |
| WO | WO 01/60770 A1 | 8/2001 |
| WO | WO 2005/113121 A1 | 1/2005 |
| WO | WO 2005/012397 A2 | 10/2005 |

OTHER PUBLICATIONS

The American Heritage Dictionary of the English Language: Fourth Edition. 2000.*
Barrer et al., Journal of Physical Chemistry, 1960, 64, 417-21.
Yaghi et al., Science, 295: 469 (2002).
Yaghi et al., J Solid State Chem., 152:1 (2000).
Eddaoudi et al., Acc. Chem. Res., 34: 319 (2001).
Russell et al., Science, 276: 575 (1997).
Kiang et al., J. Am. Chem. Soc. 121: 8204 (1999).
Hoskins et al., J. Am. Chem Soc., 111: 5962 (1989).
Li et al., Nature, 402: 276 (1999).
Serpaggi et al., J. Mater Chem., 8: 2749 (1998).
Reineke et al., J. Am. Chem. Soc., 122: 4843 (2000).
Bennett et al., Mater. Res. Bull., 3: 633 (1968).
Yaghi et al., J. Am. Chem. Soc., 122, 1391 (2000).
Yaghi et al., Micropor. Mesopor. Mater., 73: 3 (2004).
Dybtsev et al., Angew. Chem. Int. Ed., 43: 5033 (2004.

(Continued)

*Primary Examiner* — Jason M Greene
*Assistant Examiner* — Anthony Shumate
(74) *Attorney, Agent, or Firm* — Mark Goldberg

(57) ABSTRACT

The present invention discloses a novel method of making high performance mixed matrix membranes (MMMs) using stabilized concentrated suspensions of solvents, uniformly dispersed polymer stabilized molecular sieves, and at least two different types of polymers as the continuous blend polymer matrix. MMMs as dense films or asymmetric flat sheet or hollow fiber membranes fabricated by the method described in the current invention exhibit significantly enhanced permeation performance for separations over the polymer membranes made from the continuous blend polymer matrix. MMMs of the present invention are suitable for a wide range of gas, vapor, and liquid separations such as alcohol/water, $CO_2/CH_4$, $H_2/CH_4$, $O_2/N_2$, $CO_2/N_2$, olefin/paraffin, iso/normal paraffins, and other light gases separations.

12 Claims, No Drawings

OTHER PUBLICATIONS

McKeown et al., Chem. Commun., 2782 (2002).
Budd et al., j. mater. Chem.., 13:2721 (2003).
Budd et al., Chem. Commun., 230 (2004).
Budd et al., Adv. Mater., 16:456 (2004).
McKeown et al., Chem. Eur. J., 11:2610 (2005).
McKeown et al., "Phthalocyanine-based nanoporous network polymers" Chem. Commun., 2002, 2780-2781.

* cited by examiner

GAS SEPARATIONS USING HIGH PERFORMANCE MIXED MATRIX MEMBRANES

BACKGROUND OF THE INVENTION

This invention pertains to high performance mixed matrix membranes (MMMs) for use in gas and liquid separations. More particularly, the invention pertains to a novel method of making high performance MMMs using stabilized concentrated suspensions containing uniformly dispersed polymer stabilized molecular sieves and at least two types of polymers as the continuous blend polymer matrix.

Gas separation processes with membranes have undergone a major evolution since the introduction of the first membrane-based industrial hydrogen separation process about two decades ago. The design of new materials and efficient methods will further advance the membrane gas separation processes within the next decade.

The gas transport properties of many glassy and rubbery polymers have been measured as part of the search for materials with high permeability and high selectivity for potential use as gas separation membranes. Unfortunately, an important limitation in the development of new membranes for gas separation applications is a well-known trade-off between permeability and selectivity of polymers. By comparing the data of hundreds of different polymers, Robeson demonstrated that selectivity and permeability seem to be inseparably linked to one another, in a relation where selectivity increases as permeability decreases and vice versa.

Despite concentrated efforts to tailor polymer structure to improve separation properties; current polymeric membrane materials have seemingly reached a limit in the trade-off between productivity and selectivity. For example, many polyimide and polyetherimide glassy polymers such as Ultem® 1000 have much higher intrinsic $CO_2/CH_4$ selectivities ($\alpha_{CO2/CH4}$) (~30 at 50° C. and 690 kPa (100 psig) pure gas tests) than that of cellulose acetate (~22), which are more attractive for practical gas separation applications. These polymers, however, do not have outstanding permeabilities attractive for commercialization compared to current commercial cellulose acetate membrane products, in agreement with the trade-off relationship reported by Robeson. On the other hand, some inorganic membranes such as zeolite and carbon molecular sieve membranes offer much higher permeability and selectivity than polymeric membranes, but are expensive and difficult for large-scale manufacture. Therefore, it is highly desirable to provide an alternate cost-effective membrane in a position above the trade-off curves between permeability and selectivity.

Based on the need for a more efficient membrane than polymer and inorganic membranes, a new type of membrane, mixed matrix membranes (MMMs), has been developed recently. MMMs are hybrid membranes containing inorganic fillers such as molecular sieves embedded in a polymer matrix.

Mixed matrix membranes have the potential to achieve higher selectivity with equal or greater permeability compared to existing polymer membranes, while maintaining their advantages. Much of the research conducted to date on mixed matrix membranes has focused on the combination of a dispersed solid molecular sieving phase, such as molecular sieves or carbon molecular sieves, with an easily processed continuous polymer matrix. For example, see U.S. Pat. Nos. 6,626,980; 4,740,219; 5,127,925 ; 4,925,562; 4,925,459; 5,085,676; 6,663,805; 4,705,540; 4,717,393; 4,880,442; US 2004/0147796; US 2004/0107830; US 2003/0220188; US 2005/0043167; US 2002/0053284; U.S. Pat. Nos. 6,755,900; 6,500,233; 6,503,295; US 2006/0117949; US 2005/0268782; US 2005/0230305; US 2006/0107830; US 2005/0139066; and U.S. Pat. No. 6,508,860. The sieving phase in a solid/polymer mixed matrix scenario can have a selectivity that is significantly larger than the pure polymer. Addition of a small volume fraction of molecular sieves to the polymer matrix, therefore, increases the overall separation efficiency significantly. While the polymer "upper-bound" curve has been surpassed using these solid/polymer MMMs, there are still many issues that need to be addressed for large-scale industrial production of these new types of MMMs.

The first known article concerning mixed matrix membranes was published in 1960 by Barrer et al. See JOURNAL OF PHYSICAL CHEMISTRY 1960, 64, 417-21. This work reported the formation of ion exchange membranes by dispersing several different zeolites in an inert polymer resin. Voids and defects due to the poor interfacial adhesion, however, were observed at the interface of the inorganic zeolites and the organic polymer. These voids, that are much larger than the penetrating molecules, resulted in reduced overall selectivity of the mixed matrix membranes. Research has shown that the interfacial region, which is a transition phase between the continuous polymer and dispersed sieve phases, is of particular importance in forming successful MMMs.

Typical inorganic sieving phases in MMMs include various molecular sieves, carbon molecular sieves, and traditional silica. Many organic polymers, including cellulose acetate, polyvinyl acetate, polyetherimide (commercially Ultem®), polysulfone (commercial Udel®), polydimethylsiloxane, polyethersulfone, and several polyimides (including commercial Matrimid®), have been used as the continuous phase in MMMs. In recent years, significant research efforts have been focused on material compatibility and adhesion at the inorganic solid/polymer interface in order to achieve separation property enhancements over traditional polymers with MMMs. For example, Kulkarni et al. reported the use of organosilicon coupling agent functionalized molecular sieves to improve the adhesion at the sieve particle/polymer interface of the MMMs. See U.S. Pat. No. 6,508,860. Kulkarni et al. also reported the formation of MMMs with minimal macrovoids and defects by using electrostatically stabilized suspensions. See US 2006/0117949.

Despite all the research efforts, issues of material compatibility and adhesion at the inorganic solid/polymer interface in MMMs are still not completely addressed.

SUMMARY OF THE INVENTION

The present invention provides a novel method of making mixed matrix membranes (MMMs), particularly dense film MMMs and asymmetric flat sheet or hollow fiber MMMs, using stabilized concentrated suspensions (or so-called "casting dope") containing solvents, uniformly dispersed polymer stabilized molecular sieves, and at least two different types of polymers as the continuous blend polymer matrix, the method comprising: (a) dispersing the molecular sieve filler particles in at least one solvent by ultrasonic mixing and/or mechanical stirring or other method to form a slurry; (b) dissolving a suitable polymer (or so-called "molecular sieve stabilizer") that can stabilize the molecular sieve particles in the slurry to form a stabilized molecular sieve slurry; (c) dissolving two types of polymers as the continuous blend polymer matrix in the stabilized molecular sieve slurry by mechanical stirring or by mechanical stirring and with ultrasonication to form a stabilized concentrated suspension (one of the polymers used in the continuous blend polymer matrix can be the same as that used for stabilizing the molecular sieves); (d) fabricating a MMM as a dense film MMM or an asymmetric flat sheet or hollow fiber MMM using the stabilized concentrated suspension.

In some cases a membrane post-treatment step can be added to improve selectivity but does not change or damage the membrane, or cause the membrane to lose performance with time. The membrane post-treatment step can involve coating the top surface of the MMM with a thin layer of material such as a polysiloxane, a thermally curable silicon rubber, or a UV radiation curable epoxy silicon to fill the surface voids and defects on the MMM.

The molecular sieves in the MMMs provided in this invention can have a selectivity that is significantly higher than the pure polymer membranes for separations. Addition of a small weight percent of molecular sieves to the polymer matrix, therefore, increases the overall separation efficiency significantly. The molecular sieves used in the MMMs of current invention include microporous and mesoporous molecular sieves, carbon molecular sieves, and porous metal-organic frameworks (MOFs). The microporous molecular sieves are selected from alumino-phosphate molecular sieves such as AlPO-18, AlPO-14 and AlPO-17, aluminosilicate molecular sieves such as 4A, 5A, UZM-5 and UZM-9, silico-alumino-phosphate molecular sieves such as SAPO-34, and mixtures thereof.

More importantly, the molecular sieve particles dispersed in the concentrated suspension are stabilized by a suitable polymer such as a polyethersulfone (PES) that can form good adhesion at the molecular sieve/polymer interface. The good adhesion at the molecular sieve/polymer interface can be attributed to the formation of polymer-O-molecular sieve covalent bonds via reactions between the hydroxyl (—OH) groups on the surfaces of the molecular sieves and the hydroxyl (—OH) groups at the polymer chain ends or at the polymer side chains of the molecular sieve stabilizers such as PES. The good adhesion at the molecular sieve/polymer interface can also be attributed to the formation of hydrogen bonds between molecular sieves and the polymers that serve as the molecular sieve stabilizer. In this case the hydrogen bonding interactions occur between the hydroxyl (—OH) groups on the surfaces of the molecular sieves and the functional groups (e.g., amino group) at the polymer chain ends or at the polymer side chains of the molecular sieve stabilizer such as poly(ethylene imine). The formation of good adhesion and an interface substantially free of voids and defects between the molecular sieve particles and the polymer used to stabilize the molecular sieves in the concentrated suspension in the present invention results in MMMs with significant separation property enhancements over traditional polymer membranes and over those MMMs prepared from concentrated suspensions containing unstabilized molecular sieves. An absence of voids and defects at the interface increases the likelihood that the permeating species will be separated by passing through the pores of the molecular sieves in MMMs rather than passing unseparated through voids and defects. Therefore, the MMMs fabricated using the present invention combine the solution-diffusion mechanism of polymer membrane and the molecular sieving and sorption mechanism of molecular sieves, and assure maximum selectivity and consistent performance among different membrane samples comprising the same molecular sieve/polymer composition. The functions of the polymer (or so-called "molecular sieve stabilizer") used to stabilize the molecular sieve particles in the MMMs of the present invention include: 1) stabilizing the molecular sieve particles in the concentrated suspensions to remain homogeneously suspended; 2) forming good adhesion at the molecular sieve/polymer interface via hydrogen bonds or molecular sieve-O-polymer covalent bonds; 3) being an intermediate to improve the compatibility of the molecular sieves with the continuous blend polymer matrix.

The stabilized suspension contains polymer stabilized molecular sieve particles uniformly dispersed in at least two different types of polymers as the continuous blend polymer matrix. MMM, particularly dense film MMM or asymmetric flat sheet or hollow fiber MMM, are fabricated from the stabilized suspension. A MMM prepared by the present invention comprises uniformly dispersed polymer stabilized molecular sieve particles throughout the continuous blend polymer matrix. The continuous blend polymer matrix contains at least two different types of polymers such as a PES and a polyimide. The polymer used for stabilizing the molecular sieve particles can be selected either from one of the polymers used as part of the continuous blend polymer matrix such as PES or from a polymer different from those used as the continuous blend polymer matrix. The MMMs fabricated using the present method combine the solution-diffusion mechanism of polymer membranes and the molecular sieving and sorption mechanism of molecular sieves.

MMMs, particularly dense film MMMs and asymmetric flat sheet or hollow fiber MMMs, fabricated by the method described in the current invention exhibit significantly enhanced selectivity and/or permeability over the polymer membranes prepared from the blend polymer matrix and over those prepared from suspensions containing the same polymer matrix and same molecular sieves but without polymer stabilization.

The method of the current invention for producing defect free, high performance MMMs is suitable for large scale membrane production and can be integrated into commercial polymer membrane manufacturing processes.

The invention provides a process for separating at least one gas from a mixture of gases using the MMMs described in the present invention, the process comprising: (a) providing a mixed matrix gas separation membrane comprising a polymer stabilized molecular sieve filler material uniformly dispersed in a continuous polymer matrix phase consisting essentially of at least two types of polymers which are permeable to said at least one gas; (b) contacting the mixture on one side of the mixed matrix membrane to cause said at least one gas to permeate the mixed matrix membrane; and (c) removing from the opposite side of the membrane a permeate gas composition comprising a portion of said at least one gas which permeated said membrane.

MMMs of the present invention are suitable for a variety of gas, vapor, and liquid separations, and are particularly suitable for gas and vapor separations such as separations of the following pairs: $CO_2/CH_4$, $H_2/CH_4$, $O_2/N_2$, $CO_2/N_2$, olefin/paraffin, and iso/normal paraffins.

DETAILED DESCRIPTION OF THE INVENTION

MMMs containing molecular sieve materials as dispersed fillers may retain polymer processability and improve selectivity for separations due to the superior molecular sieving and sorption properties of the molecular sieve materials. MMMs have received worldwide attention during the last two decades. For most cases, however, aggregation of the molecular sieve particles in the polymer matrix and the poor adhesion at the interface of molecular sieve particles and the polymer matrix in MMMs that result in poor mechanical and processing properties and poor permeation performance still need to be addressed. Material compatibility and good adhesion between the polymer matrix and the molecular sieve particles are needed to achieve enhanced selectivity of the MMMs. Poor adhesion that results in voids and defects around the molecular sieve particles that are larger than the pores inside the molecular sieves decrease the overall selectivity of the MMM by allowing the species to be separated to bypass the pores of the molecular sieves. Thus, the MMMs can only at most exhibit the selectivity of the continuous polymer matrix.

The present invention pertains to high performance mixed matrix membranes (MMMs). More particularly, the invention pertains to a novel method of making high performance MMMs using stabilized concentrated suspensions (also called "casting dope") containing uniformly dispersed polymer stabilized molecular sieves and at least two types of polymers as the continuous blend polymer matrix. The term "mixed matrix" as used in this invention means that the membrane has a selective permeable layer which comprises a continuous blend polymer matrix of at least two types of polymeric materials and discrete polymer stabilized molecular sieve particles uniformly dispersed throughout the continuous blend polymer matrix.

The present invention provides a novel method of making mixed matrix membranes (MMMs), particularly dense film MMMs and asymmetric flat sheet or hollow fiber MMMs, using stabilized concentrated suspensions containing solvents, uniformly dispersed polymer stabilized molecular sieves, and at least two different types of polymers as the continuous blend polymer matrix, the method comprising: (a) dispersing the molecular sieve filler particles in a solvent or a mixture of two or more solvents by ultrasonic mixing and/or mechanical stirring to form a slurry; (b) dissolving a suitable polymer (or so-called "molecular sieve stabilizer") that can stabilize the molecular sieve particles in the slurry to form a polymer stabilized molecular sieve slurry; (c) dissolving two types of polymers as the continuous blend polymer matrix in the stable slurry by mechanical stirring or by mechanical stirring and ultrasonication to form a stabilized concentrated suspension, wherein one of the polymers can be the same as that used for stabilizing the molecular sieves; and (d) fabricating a MMM as a dense film MMM or an asymmetric flat sheet or hollow fiber MMM using the stabilized concentrated suspension.

In some cases, a membrane post-treatment step can be added to improve selectivity but does not change or damage the membrane, or cause the membrane to lose performance with time. The membrane post-treatment step can involve coating the top surface of the MMM with a thin layer of material such as a polysiloxane, a thermally curable silicon rubber, or a UV radiation curable epoxy silicon to fill the surface voids and defects on the MMM.

Design of the MMMs containing uniformly dispersed polymer stabilized molecular sieves described herein is based on the proper selection of molecular sieves, the polymer used for stabilizing the molecular sieves, the continuous blend polymer matrix comprising at least two types of polymers, and the solvents used to dissolve the polymers.

The molecular sieves in the MMMs provided in this invention can have a selectivity that is significantly higher than the pure polymer membranes for separations. Addition of a small weight percent of molecular sieves to the polymer matrix, therefore, increases the overall separation efficiency significantly. The molecular sieves used in the MMMs of current invention include microporous and mesoporous molecular sieves, carbon molecular sieves, and porous metal-organic frameworks (MOFs).

Molecular sieves improve the performance of the MMM by including selective holes/pores with a size that permits a gas such as carbon dioxide to pass through, but either does not permit another gas such as methane to pass through, or permits it to pass through at a significantly slower rate. The molecular sieves should have higher selectivity for the desired separations than the original polymer to enhance the performance of the MMM. In order to obtain the desired gas separation in the MMM, it is preferred that the steady-state permeability of the faster permeating gas component in the molecular sieves be at least equal to that of the faster permeating gas in the original polymer matrix phase. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves of different chemical compositions can have the same framework structure.

Zeolites can be further broadly described as molecular sieves in which complex aluminosilicate molecules assemble to define a three-dimensional framework structure enclosing cavities occupied by ions and water molecules which can move with significant freedom within the zeolite matrix. In commercially useful zeolites, the water molecules can be removed or replaced without destroying the framework structure. Zeolite composition can be represented by the following formula: $M_{2/n}O:Al_2O_3:xSiO_2:yH_2O$, wherein M is a cation of valence n, x is greater than or equal to 2, and y is a number determined by the porosity and the hydration state of the zeolites, generally from 0 to 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations or hydrogen by conventional ion exchange. Acid forms of molecular sieve sorbents can be prepared by a variety of techniques including ammonium exchange followed by calcination or by direct exchange of alkali ions for protons using mineral acids or ion exchangers.

Microporous molecular sieve materials are microporous crystals with pores of a well-defined size ranging from about 0.2 to 2 nm. This discrete porosity provides molecular sieving properties to these materials which have found wide applications as catalysts and sorption media. Molecular sieve structure types can be identified by their structure type code as assigned by the IZA Structure Commission following the rules set up by the IUPAC Commission on Zeolite Nomenclature. Each unique framework topology is designated by a structure type code consisting of three capital letters. Preferred low silica-to-alumina molar ratio molecular sieves used in the present invention include molecular sieves having IZA structural designations of AEI, CHA, ERI, LEV, AFX, AFT and GIS. Exemplary compositions of such small pore alumina containing molecular sieves include non-zeolitic molecular sieves (NZMS) comprising certain aluminophosphates (AlPO's), silicoaluminophosphates (SAPO's), metallo-aluminophosphates (MeAPO's), elemental aluminophosphates (ElAPO's), metallo-silicoaluminophosphates (MeAPSO's) and elemental silicoaluminophosphates (ElAPSO's). Representative examples of microporous molecular sieves are small pore molecular sieves such as SAPO-34, Si-DDR, UZM-9, AlPO-14, AlPO-34, AlPO-17, SSZ-62, SSZ-13, AlPO-18, LTA, UZM-13, ERS-12, CDS-1, MCM-65, MCM-47, 4A, 5A, UZM-5, UZM-9, AlPO-34, SAPO-44, SAPO-47, SAPO-17, CVX-7, SAPO-35, SAPO-56, AlPO-52, SAPO-43, medium pore molecular sieves such as Si-MFI, Si-BEA, Si-MEL, and large pore molecular sieves such as FAU, OFF, zeolite L, NaX, NaY, and CaY.

Another type of molecular sieves used in the MMMs provided in this invention are mesoporous molecular sieves. Examples of preferred mesoporous molecular sieves include MCM-41, SBA-15, and surface functionalized MCM-41 and SBA-15, etc.

Metal-organic frameworks (MOFs) can also be used as the molecular sieves in the MMMs described in the present invention. MOFs are a new type of highly porous crystalline zeolite-like materials and are composed of rigid organic units assembled by metal-ligands. They possess vast accessible surface areas per unit mass. See Yaghi et al., SCIENCE, 295: 469 (2002); Yaghi et al., J. SOLID STATE CHEM., 152: 1 (2000); Eddaoudi et al., ACC. CHEM. RES., 34: 319 (2001); Russell et al., SCIENCE, 276: 575 (1997); Kiang et al., J. AM. CHEM. SOC., 121: 8204 (1999); Hoskins et al., J. AM. CHEM. SOC., 111: 5962 (1989); Li et al., NATURE, 402: 276 (1999); Serpaggi et al., J. MATER. CHEM., 8: 2749 (1998); Reineke et al., J. AM. CHEM. SOC., 122: 4843 (2000); Bennett et al., MATER. RES. BULL., 3: 633 (1968); Yaghi et al., J. AM. CHEM. SOC., 122: 1393 (2000); Yaghi et al., MICROPOR. MESOPOR. MATER., 73: 3 (2004); Dybtsev et al., ANGEW. CHEM. INT. ED., 43: 5033 (2004). MOF-5 is a prototype of a new class of porous materials constructed from octahedral Zn—O—C clusters and benzene links. Most recently, Yaghi et al. reported the systematic design and construction of a series of frameworks (IRMOF) that have structures based on the skeleton of MOF-5, wherein the pore functionality and size have been varied without changing the original cubic topology. For example, IRMOF-1 ($Zn_4O(R_1\text{-}BDC)_3$) has the same topology as that of MOF-5, but was synthesized by a simplified method. In 2001, Yaghi et al. reported the synthesis of a porous metal-organic polyhedron (MOP) $Cu_{24}(m\text{-}BDC)_{24}(DMF)_{14}(H_2O)_{50}(DMF)_6(C_2H_5OH)_6$, termed "α-MOP-1" and constructed from 12 paddle-wheel units bridged by m-BDC to give a large metal-carboxylate polyhedron. See Yaghi et al., 123: 4368 (2001). These MOF, IR-MOF and MOP materials exhibit analogous behaviour to that of conventional microporous materials such as large and accessible surface areas, with interconnected intrinsic micropores. Moreover, they may reduce the hydrocarbon fouling problem of the polyimide membranes due to relatively larger pore sizes than those of zeolite materials. MOF, IR-MOF and MOP materials are also expected to allow the polymer to infiltrate the pores, which would improve the interfacial and mechanical properties and would in turn affect permeability. Therefore, these MOF, IR-MOF and MOP materials (all termed "MOF" herein this invention) are used as molecular sieves in the preparation of MMMs in the present invention.

The particle size of the molecular sieves dispersed in the continuous blend polymer matrix of the MMMs in the present invention should be small enough to form a uniform dispersion of the particles in the concentrated suspensions from which the MMMs will be fabricated. The median particle size should be less than about 10 µm, preferably less than 5 µm, and more preferably less than 1 µm. Most preferably, nano-molecular sieves (or "molecular sieve nanoparticles") should be used in the MMMs of the current invention.

Nano-molecular sieves described herein are sub-micron size molecular sieves with particle sizes in the range of 5 to 1000 nm. Nano-molecular sieve selection for the preparation of MMMs includes screening the dispersity of the nano-molecular sieves in organic solvent, the porosity, particle size, and surface functionality of the nano-molecular sieves, the adhesion or wetting property of the nano-molecular sieves with the polymer matrix. Nano-molecular sieves for the preparation of MMMs should have suitable pore size to allow selective permeation of a smaller sized gas, and also should have appropriate particle size in the nanometer range to prevent defects in the membranes. The nano-molecular sieves should be easily dispersed without agglomeration in the polymer matrix to maximize the transport property.

The nano-molecular sieves described herein are synthesized from initially clear solutions. Representative examples of nano-molecular sieves suitable to be incorporated into the MMMs described herein include Si-MFI (or silicalite-1), SAPO-34, Si-MTW, Si-BEA, Si-MEL, LTA, FAU, Si-DDR, AlPO-14, AlPO-34, AlPO-18, SSZ-62, UZM-5, UZM-9, UZM-13, UZM-17, UZM-19, and MCM-65.

In the present invention, the molecular sieve particles dispersed in the concentrated suspension from which MMMs are formed are stabilized by a suitable polymer that can form good adhesion at the molecular sieve/polymer interface. The surfaces of the molecular sieves in the concentrated suspensions contain many hydroxyl groups attached to silicon (if present), aluminum (if present) and phosphate (if present). These hydroxyl groups on the molecular sieves in the concentrated suspensions can affect long-term stability of the suspensions and phase separation kinetics of the MMMs. The stability of the concentrated suspensions refers to the characteristic of the molecular sieve particles remaining homogeneously dispersed in the suspension. A key factor in determining whether aggregation of molecular sieve particles can be prevented and a stable suspension formed is the compatibility of these molecular sieve surfaces with the polymers and the solvents in the suspensions. The formation of good adhesion and an interface substantially free of voids and defects between the molecular sieve particles and the polymer used to stabilize the molecular sieves in the concentrated suspension in the present invention results in MMMs with significant separation property enhancements over traditional polymer membranes and over those MMMs prepared from concentrated suspensions containing unstabilized molecular sieves. Absence of voids and defects at the interface prevents the species to be separated from bypassing through voids and defects instead of the pores of the molecular sieves in MMMs. Therefore, the MMMs fabricated using the present method combine the solution-diffusion mechanism of polymer membrane and the molecular sieving and sorption mechanism of molecular sieves, and assure maximum selectivity and consistent performance among different membrane samples comprising the same molecular sieve/polymer composition.

The functions of the polymer used to stabilize the molecular sieve particles in the MMMs of the present invention include stabilizing the molecular sieve particles in the concentrated suspensions to remain homogeneously suspended, forming good adhesion at the molecular sieve/polymer interface via hydrogen bonds or molecular sieve-O-polymer covalent bonds and improving the compatibility of the molecular sieves with the continuous blend polymer matrix. Any polymer that has these functions should be suitable as a stabilizer to stabilize the molecular sieve particles in the concentrated suspensions from which MMMs are formed. Preferably, the polymers that serve as the molecular sieve stabilizers contain functional groups such as amino groups that can form hydrogen bonding with the hydroxyl groups on the surfaces of the molecular sieves. More preferably, the polymers that serve as the molecular sieve stabilizers contain functional groups such as hydroxyl or isocyanate groups that can react with the hydroxyl groups on the surface of the molecular sieves to form polymer-O-molecular sieve covalent bonds. Thus, good adhesion between the molecular sieves and polymer is achieved. Representatives of such polymers are hydroxyl or amino group-terminated or ether polymers such as polyethersulfones (PESs), sulfonated PESs, polyethers such as hydroxyl group-terminated poly(ethylene oxide)s, amino group-terminated poly(ethylene oxide)s, or isocyanate group-terminated poly(ethylene oxide)s, hydroxyl group-terminated poly(propylene oxide)s, hydroxyl group-terminated co-block-poly(ethylene oxide)-poly(propylene oxide)s, hydroxyl group-terminated tri-block-poly(propylene oxide)-block-poly(ethylene oxide)-block-poly(propylene oxide)s, tri-block-poly(propylene glycol)-block-poly(ethylene glycol)-block-poly(propylene glycol) bis(2-aminopropyl ether), polyether ketones, poly(ethylene imine)s, poly(amidoamine)s, poly(vinyl alcohol)s, poly(allyl amine)s, poly(vinyl amine)s, and polyetherimides such as Ultem (or Ultem 1000) sold under the trademark Ultem®, manufactured by GE Plastics, as well as hydroxyl group-containing glassy polymers such as cellulosic polymers including cellulose acetate, cellulose triacetate, cellulose acetate-butyrate, cellulose propionate, ethyl cellulose, methyl cellulose, and nitrocellulose. The polymer used for stabilizing the molecular sieve particles can be selected either from one of the polymers as part of the continuous blend polymer matrix or from a different polymer.

The weight ratio of the molecular sieves to the polymer as the stabilizer for the molecular sieves in the MMMs of the current invention can be within a broad range, but not limited to, from about 5:100 to 100:1 based on the polymer as the stabilizer for the molecular sieves, i.e. 5 weight parts of molecular sieve per 100 weight parts of polymer to about 100 weight parts of molecular sieve per 1 weight part of polymer depending upon the properties sought as well as the dispersibility of a particular molecular sieves in a particular suspension. Preferably the weight ratio of the molecular sieves to the polymer as the stabilizer for the molecular sieves in the MMMs of the current invention is in the range from about 10:1 to 1:20.

The stabilized suspension contains polymer stabilized molecular sieve particles uniformly dispersed in at least two types of polymers as the continuous blend polymer matrix. MMM, particularly dense film MMM or asymmetric flat sheet or hollow fiber MMM, is fabricated from the stabilized suspension. The MMM prepared by the present invention comprises uniformly dispersed polymer stabilized molecular sieve particles throughout the continuous blend polymer matrix. The continuous blend polymer matrix contains at least two types of polymers. Polymers as the continuous polymer matrix in MMMs in the present invention provide a wide range of properties important for separations, and modifying them can improve membrane selectivity. A material with a high glass transition temperature (Tg), high melting point, and high crystallinity is preferred for most gas separations. Glassy polymers (i.e., polymers below their Tg) have stiffer polymer backbones and therefore let smaller molecules such as hydrogen and helium permeate the membrane more quickly and larger molecules such as hydrocarbons permeate the membrane more slowly.

For the MMM applications in the present invention, it is preferred that the membrane fabricated from the pure polymer, which can be used as the continuous polymer matrix in MMMs, exhibits a carbon dioxide or hydrogen over methane selectivity of at least about 15, more preferably at least about 20. Preferably, the two or more polymers used as the continuous blend polymer matrix in the MMMs of the present invention are rigid, glassy polymers. The weight ratio of the two polymers as the continuous blend polymer matrix in the MMMs of the current invention can be within a broad range from 1:100 to 100:1 depending upon the properties sought as well as the miscibility of the two polymers. A preferred weight ratio of the two polymers as the continuous blend polymer matrix in the MMMs of the current invention is in the range from 1:10 to 10:1 depending upon the properties sought as well as the miscibility of the two polymers.

Typical polymers suitable for MMM preparation as the continuous polymer matrix can be selected from, but are not limited to, polysulfones; sulfonated polysulfones; polyethersulfones (PESs); sulfonated PESs; polyethers; polyetherimides such as Ultem (or Ultem 1000) sold under the trademark Ultem®, manufactured by GE Plastics, poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate, cellulose triacetate, cellulose acetate-butyrate, cellulose propionate, ethyl cellulose, methyl cellulose, nitrocellulose; polyamides; polyimides such as Matrimid sold under the trademark Matrimid® by Huntsman Advanced Materials (Matrimid® 5218 refers to a particular polyimide polymer sold under the trademark Matrimid®) and P84 or P84HT sold under the tradename P84 and P84HT respectively from HP Polymers GmbH; polyamide/imides; polyketones, polyether ketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; microporous polymers; and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acryl groups and the like.

Some preferred polymers as the continuous blend polymer matrix include, but are not limited to, polysulfones, sulfonated polysulfones, polyethersulfones (PESs), sulfonated PESs, polyethers, polyetherimides such as Ultem (or Ultem 1000) cellulosic polymers such as cellulose acetate and cellulose triacetate, polyamides; polyimides such as Matrimid, poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)), poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) (poly(BTDA-PMDA-ODPA-TMMDA)), poly(3,3',4,4'-diphenylsulfone tetracarboxylic dianhydride-3,3',5,5'-tetramethyl-4,4'-methylene dianiline) (poly(DSDA-TMMDA)), poly(3,3',4,4'-benzophenone tetracarboxylic dianhydride-3,3',5,5'-tetramethyl-4,4'-methylene dianiline) (poly(BTDA-TMMDA)), poly(3,3',4,4'-diphenylsulfone tetracarboxylic dianhydride-pyromellitic dianhydride-3,3',5,5'-tetramethyl-4,4'-methylene dianiline) (poly (DSDA-PMDA-TMMDA)), poly[2,2'-bis-(3,4-dicarboxyphenyl)hexafluoropropane dianhydride-1,3-phenylenediamine] (poly(6FDA-m-PDA)), poly[2,2'-bis-(3,4-dicarboxyphenyl)hexafluoropropane dianhydride-1,3-phenylenediamine-3,5-diaminobenzoic acid)] (poly(6FDA-m-PDA-DABA)), P84 or P84HT; polyamide/imides; polyketones, polyether ketones; and microporous polymers.

The most preferred polymers as the continuous blend polymer matrix include, but are not limited to, polyethersulfones, polyimides such as Matrimid®, P84®, and poly(3,3',4,4'-diphenylsulfone tetracarboxylic dianhydride-3,3',5,5'-tetramethyl-4,4'-methylene dianiline), polyetherimides such as Ultem®, polysulfones, cellulose acetate, cellulose triacetate, poly(vinyl alcohol)s, and microporous polymers.

Microporous polymers (or as so-called "polymers of intrinsic microporosity") described herein are polymeric materials that possess microporosity that is intrinsic to their molecular structures. See McKeown, et al., CHEM. COMMUN., 2780 (2002); McKeown, et al., CHEM. COMMUN., 2782 (2002); Budd, et al., J. MATER. CHEM., 13:2721 (2003); Budd, et al., CHEM. COMMUN., 230 (2004); Budd, et al., ADV. MATER., 16:456 (2004); McKeown, et al., CHEM. EUR. J., 11:2610 (2005). This type of microporous polymers can be used as the continuous polymer matrix in MMMs in the current invention. The microporous polymers have a rigid rod-like, randomly contorted structure to generate intrinsic microporosity. These microporous polymers exhibit behavior analogous to that of conventional microporous molecular sieve materials, such as large and accessible surface areas, interconnected intrinsic micropores of less than 2 nm in size, as well as high chemical and thermal stability, but, in addition, possess properties of conventional polymers such as good solubility and easy processability. Moreover, these microporous polymers possess polyether polymer chains that have favorable interaction between carbon dioxide and the ethers.

The weight ratio of the molecular sieves to the blend polymers as the continuous polymer matrix in the MMMs of the current invention can be within a broad range from about 1:100 (1 weight part of molecular sieves per 100 weight parts of polymers as the continuous polymer matrix) to about 1:1 (100 weight parts of molecular sieves per 100 weight parts of polymers as the continuous polymer matrix) depending upon the properties sought as well as the dispersibility of the particular molecular sieves in the particular continuous polymer matrix.

The solvents used for dispersing the molecular sieve particles in the concentrated suspension and for dissolving the polymers as the stabilizer for the molecular sieves and as the continuous blend polymer matrix are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of polymeric membranes, such as N-methylpyrrolidone (NMP) and N,N-dimethyl acetamide (DMAC), methylene chloride, THF, acetone, DMF, DMSO, toluene, dioxanes, 1,3-dioxolane, mixtures thereof, others known to those skilled in the art and mixtures thereof.

In the present invention, MMMs can be fabricated with various membrane structures such as mixed matrix dense films, flat sheet asymmetric MMMs, thin film composite MMMs, or hollow fiber asymmetric MMMs from the stabilized concentrated suspensions containing solvents, polymer stabilized molecular sieves, and at least two types of polymers as the continuous blend polymer matrix. For example, the suspension can be sprayed, spin coated, poured into a sealed glass ring on top of a clean glass plate, or cast with a doctor knife. In another method, a porous substrate can be dip coated with the suspension. One solvent removal technique used in the present invention is the evaporation of volatile solvents by ventilating the atmosphere above the forming membrane with a diluent dry gas and drawing a vacuum. Another solvent removal technique used in the present invention calls for immersing the cast thin layer of the concentrated suspension (previously cast on a glass plate or on a porous or permeable substrate) in a non-solvent for the polymers that is miscible with the solvents of the suspension. To facilitate the removal of the solvents, the substrate and/or the atmosphere or non-solvent into which the thin layer of dispersion is immersed can be heated. When the mixed matrix membrane is substantially free of solvents, it can be detached from the glass plate to form a free-standing (or self-supporting) structure or the mixed matrix membrane can be left in contact with a porous or permeable support substrate to form an integral composite assembly. Additional fabrication steps that can be used include washing the mixed matrix membrane in a bath of an appropriate liquid to extract residual solvents and other foreign matters from the membrane, drying the washed mixed matrix membrane to remove residual liquid, and in some cases coating a thin layer of material such as a polysiloxane, a thermally curable silicon rubber, or a UV radiation curable epoxy silicon to fill the surface voids and defects on the MMM. One preferred embodiment of the current invention is in the form of a flat sheet asymmetric MMM for gas separation comprising a smooth thin dense selective layer on top of a highly porous supporting layer. No major voids and defects on the top surface were observed. The back electron image (BEI) of the flat sheet asymmetric MMM showed that the polymer stabilized molecular sieve particles were uniformly distributed from the top dense layer to the porous support layer.

The method of the present invention for producing high performance MMMs is suitable for large scale membrane production and can be integrated into commercial polymer membrane manufacturing process. MMMs, particularly dense film MMMs and asymmetric flat sheet or hollow fiber MMMs, fabricated by the method described in the current invention exhibit significantly enhanced selectivity and/or permeability over polymer membranes prepared from the blend polymer matrix and over those prepared from suspensions containing the same polymer matrix and same molecular sieves but without polymer stabilization.

The current invention provides a process for separating at least one gas from a mixture of gases using the MMMs described in the present invention, the process comprising: (a) providing a mixed matrix gas separation membrane comprising a polymer stabilized molecular sieve filler material uniformly dispersed in a continuous polymer matrix phase consisting essentially of at least two types of polymers which are permeable to said at least one gas; (b) contacting the mixture on one side of the mixed matrix membrane to cause said at least one gas to permeate the mixed matrix membrane; and (c) removing from the opposite side of the membrane a permeate gas composition comprising a portion of said at least one gas which permeated said membrane.

MMMs of the present invention are suitable for a variety of gas, vapor, and liquid separations, and particularly suitable for gas and vapor separations such as separations of $CO_2$/$CH_4$, $H_2$/$CH_4$, $O_2$/$N_2$, $CO_2$/$N_2$, olefin/paraffin, and iso/normal paraffins.

The MMMs of the present invention are especially useful in the purification, separation or adsorption of a particular species in the liquid or gas phase. In addition to separation of pairs of gases, these MMMs may, for example, be used for the separation of proteins or other thermally unstable compounds, e.g. in the pharmaceutical and biotechnology industries. The MMMs may also be used in fermenters and bioreactors to transport gases into the reaction vessel and transfer cell culture medium out of the vessel. Additionally, the MMMs may be used for the removal of microorganisms from air or water streams, water purification, ethanol production in a continuous fermentation/membrane pervaporation system, and in detection or removal of trace compounds or metal salts in air or water streams.

The MMMs of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the MMMs described herein. More than two gases can be removed from a third gas. For example, some of the gas components which can be selectively removed from a raw natural gas using the membranes described herein include carbon dioxide, oxygen, nitrogen, water vapor, hydrogen sulfide, helium, and other trace gases. Some of the gas components that can be selectively retained include hydrocarbon gases.

The MMMs described in the current invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these MMMs may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The MMMs may incorporate a species that adsorbs strongly to certain gases (e.g. cobalt porphyrins or phthalocyanines for $O_2$ or silver(I) for ethane) to facilitate their transport across the membrane.

These MMMs may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using these MMMs is the deep desulfurization of gasoline and diesel fuels by a pervaporation membrane process similar to the process described in U.S. Pat. No. 7,048,846 B2, incorporated by reference herein in its entirety. The MMMs that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using an inventive membrane include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The MMMs may be used for separation of organic molecules from water (e.g. ethanol and/or phenol from water by pervaporation) and removal of metal and other organic compounds from water.

An additional application for the MMMs is in chemical reactors to enhance the yield of equilibrium-limited reactions by selective removal of a specific product in an analogous fashion to the use of hydrophilic membranes to enhance esterification yield by the removal of water.

The present invention pertains to high performance MMMs fabricated from stabilized concentrated suspensions containing uniformly dispersed polymer stabilized molecular sieves and at least two types of polymers as the continuous blend polymer matrix. These new MMMs have immediate applications for the separation of gas mixtures including carbon dioxide removal from natural gas. MMM permits carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

Any given pair of gases that differ in size, for example, nitrogen and oxygen, carbon dioxide and methane, carbon dioxide and nitrogen, hydrogen and methane or carbon monoxide, helium and methane, can be separated using the MMMs described herein. More than two gases can be removed from a third gas. For example, some of the components which can be selectively removed from a raw natural gas using the membranes described herein include carbon dioxide, oxygen, nitrogen, water vapor, hydrogen sulfide, helium, and other trace gases. Some of the components that can be selectively retained include hydrocarbon gases.

EXAMPLES

The following examples are provided to illustrate one or more preferred embodiments of the invention, but are not limited embodiments thereof. Numerous variations can be made to the following examples that lie within the scope of the invention.

Example 1

Preparation of "Control" P84-PES Blend Polymer Dense Film 6.5 g of P84 polyimide polymer (sold under the tradename P84 from HP Polymers GmbH) and 3.5 g of polyethersulfone (PES, sold under the tradename ULTRASON E6010 Natural from BASF) were dissolved in a mixture of 13.0 g of NMP and 27.0 g of 1,3-dioxolane by mechanical stirring. The mixture was stirred for 3 h at room temperature to completely dissolve the polymers. The resulting homogeneous casting dope was allowed to degas overnight. A "control" P84-PES blend polymer dense film was cast from the bubble free casting dope on a clean glass plate using a doctor knife with a 20-mil gap. The dense film together with the glass plate was then put into a vacuum oven. The solvents were removed by slowly increasing the vacuum and the temperature of the vacuum oven. Finally, the dense film was dried at 200° C. under vacuum for at least 48 hours to completely remove the residual solvents to form the "control" P84-PES blend polymer dense film (abbreviated as "control" P84-PES in Tables 1 and 2).

Example 2

Preparation of "control" Matrimid-PES Blend Polymer Dense Film 12.0 g of Matrimid 5218 polyimide polymer (sold under the trademark Matrimid® by Huntsman Advanced Materials) and 8.0 g of polyethersulfone (PES ULTRASON E6010 Natural) were dissolved in a mixture of 26.0 g of NMP and 54.0 g of 1,3-dioxolane by mechanical stirring. The mixture was stirred for 3 hours at room temperature to completely dissolve the polymers. The resulting homogeneous casting dope was allowed to degas overnight. A "control" Matrimid-PES blend polymer dense film was cast from the bubble free casting dope on a clean glass plate using a doctor knife with a 20-mil gap. The dense film together with the glass plate was then put into a vacuum oven. The solvents were removed by slowly increasing the vacuum and the temperature of the vacuum oven. Finally, the dense film was dried at 200° C. under vacuum for at least 48 hours to completely remove the residual solvents to form "control" Matrimid-PES blend polymer dense film (abbreviated as "control" Matrimid-PES in Tables 3 and 4).

Example 3

Preparation of 30% AlPO-14/P84-PES Mixed Matrix Dense Film 3.0 g of AlPO-14 molecular sieves were dispersed in a mixture of 13.0 g of NMP and 27.0 g of 1,3-dioxolane by mechanical stirring and ultrasonication to form a slurry. The slurry was stirred for 1 hour and then 1.5 g of polyethersulfone (PES ULTRASON E6010 Natural) was added to stabilize AlPO-14 molecular sieves in the slurry. The slurry was stirred for another 1 hour to completely dissolve PES polymer and then 2.0 g of PES as one part of the continuous polymer matrix was added. The mixture was further stirred for 2 hours to completely dissolve PES polymer and form a stabilized suspension. After that, 1.5 g of P84 polyimide polymer (sold under the tradename P84 from HP Polymers GmbH) was added and it was dissolved in the suspension after stirring for 2 hours. Finally, 5.0 g of P84 polymer was added and it was dissolved in the suspension after stirring for 3 hours to form a stabilized concentrated suspension containing 30 wt-% of uniformly dispersed PES stabilized AlPO-14 molecular sieves (weight ratio of AlPO-14 to P84 and PES is 30:100; weight ratio of PES to P84 is 53.8:100) in the continuous P84-PES blend polymer matrix. The stabilized concentrated suspension was allowed to degas overnight.

A 30% AlPO-14/P84-PES mixed matrix dense film was cast on a clean glass plate from the bubble free stabilized concentrated suspension using a doctor knife with a 20-mil gap. The film together with the glass plate was then put into a vacuum oven. The solvents were removed by slowly increasing the vacuum and the temperature of the vacuum oven. Finally, the dense film was dried at 200° C. under vacuum for at least 48 hours to completely remove the residual solvents to form 30% AlPO-14/P84-PES mixed matrix dense film (abbreviated as 30% AlPO-14/P84-PES in Tables 1 and 2).

Example 4

Preparation of 30% AlPO-14/Matrimid-PES Mixed Matrix Dense Film 3.0 g of AlPO-14 molecular sieves were dispersed in a mixture of 13.0 g of NMP and 27.0 g of 1,3-dioxolane by mechanical stirring and ultrasonication to form a slurry. The slurry was stirred for 1 h and then 1.5 g of polyethersulfone (PES ULTRASON E6010 Natural) was added to stabilize AlPO-14 molecular sieves in the slurry. The slurry was stirred for another 1 h to completely dissolve PES polymer and then 2.5 g of PES as one part of the continuous polymer matrix was added. The mixture was further stirred for 2 h to completely dissolve PES polymer and form a stabilized suspension. After that, 1.5 g of Matrimid 5218 polyimide polymer was added and it was dissolved in the suspension after stirring for 2 hours. Finally, 4.5 g of Matrimid 5218 polymer was added and it was dissolved in the suspension after stirring for 3 hours to form a stabilized concentrated suspension containing 30 wt-% of uniformly dispersed PES stabilized AlPO-14 molecular sieves (weight ratio of AlPO-14 to Matrimid and PES is 30:100; weight ratio of PES to Matrimid is 66.7:100) in the continuous Matrimid-PES blend polymer matrix. The stabilized concentrated suspension was allowed to degas overnight.

A 30% AlPO-14/Matrimid-PES mixed matrix dense film was cast on a clean glass plate from the bubble free stabilized concentrated suspension using a doctor knife with a 20-mil gap. The film together with the glass plate was then put into a vacuum oven. The solvents were removed by slowly increasing the vacuum and the temperature of the vacuum oven. Finally, the dense film was dried at 200° C. under vacuum for at least 48 h to completely remove the residual solvents to form 30% AlPO-14/Matrimid-PES mixed matrix dense film (abbreviated as 30% AlPO-14/Matrimid-PES in Tables 3 and 4).

Example 5

Preparation of 30% SAPO-34/Matrimid-PES Mixed Matrix Dense Film 3.0 g of SAPO-34 molecular sieves were dispersed in a mixture of 13.0 g of NMP and 27.0 g of 1,3-dioxolane by mechanical stirring and ultrasonication to form a slurry. The slurry was stirred for 1 hour and then 1.5 g of polyethersulfone (PES, ULTRASON E6010 Natural) was added to stabilize SAPO-34 molecular sieves in the slurry. The slurry was stirred for another 1 hour to completely dissolve PES polymer and then 2.5 g of PES as one part of the continuous polymer matrix was added. The mixture was further stirred for 2 hours to completely dissolve PES polymer and form a stabilized suspension. After that, 1.5 g of Matrimid 5218 polyimide polymer (sold under the trademark Matrimid® by Huntsman Advanced Materials) was added and it was dissolved in the suspension after stirring for 2 hours. Finally, 4.5 g of Matrimid 5218 polymer was added and it was dissolved in the suspension after stirring for 3 hours to form a stabilized concentrated suspension containing 30 wt-% of uniformly dispersed PES stabilized SAPO-34 molecular sieves (weight ratio of SAPO-34 to Matrimid and PES is 30:100; weight ratio of PES to Matrimid is 66.7:100) in the continuous Matrimid-PES blend polymer matrix. The stabilized concentrated suspension was allowed to degas overnight.

A 30% SAPO-34/Matrimid-PES mixed matrix dense film was cast on a clean glass plate from the bubble free stabilized concentrated suspension using a doctor knife with a 20-mil gap. The film together with the glass plate was then put into a vacuum oven. The solvents were removed by slowly increasing the vacuum and the temperature of the vacuum oven. Finally, the dense film was dried at 200° C. under vacuum for at least 48 hours to completely remove the residual solvents to form 30% SAPO-34/Matrimid-PES mixed matrix dense film (abbreviated as 30% SAPO-34/Matrimid-PES in Tables 3 and 4).

Example 6

Preparation of "Control" P84-PES Flat Sheet Asymmetric Blend Polymer Membrane 6.5 g of P84 polyimide polymer and 3.5 g of polyethersulfone (PES ULTRASON E6010 Natural) were dissolved in a mixture of 13.0 g of NMP and 27.0 g of 1,3-dioxolane by mechanical stirring. The mixture was stirred for 3 h at room temperature to completely dissolve the polymers. The resulting homogeneous casting dope was allowed to degas overnight.

A P84-PES film was cast on a non-woven fabric substrate from the bubble free casting dope using a doctor knife with a 10-mil gap. The film together with the fabric substrate was gelled by immersing in a room temperature DI water bath for about 30 min, and then washed with 2-propanol for about 20 min to remove the residual solvents and the water. The resulting wet "control" P84-PES flat sheet asymmetric blend polymer membrane was dried at about 70-80° C. in an oven to completely remove the solvents and the water. The dry "control" P84-PES flat sheet asymmetric blend polymer membrane was then coated with a thermally curable silicon rubber solution (RTV615A+B Silicon Rubber from GE Silicons) containing 27 wt-% RTV615A and 3 wt-% RTV615B catalyst and 70 wt-% cyclohexane solvent). The RTV615A+B coated membrane was cured at 85° C. for at least 2 hours in an oven to form the final "control" P84-PES flat sheet asymmetric blend polymer membrane (abbreviated as Asymmetric P84-PES in Table 5).

Example 7

Preparation of 30% AlPO-14/P84-PES Flat Sheet Asymmetric Mixed Matrix Membrane Using Concentrated Suspension Containing PES Stabilized AlPO-14 Molecular Sieve Particles 3.0 g of AlPO-14 molecular sieves were dispersed in a mixture of 13.0 g of NMP and 27.0 g of 1,3-dioxolane by mechanical stirring and ultrasonication to form a slurry. The slurry was stirred for 1 hour and then 1.5 g of polyethersulfone (PES ULTRASON E6010 Natural) was added to stabilize AlPO-14 molecular sieves in the slurry. The slurry was stirred for another 1 hour to completely dissolve PES polymer and then 2.0 g of PES as one part of the continuous polymer matrix was added. The mixture was further stirred for 2 hours to completely dissolve PES polymer and form a stabilized suspension. After that, 1.5 g of P84 polyimide polymer (sold under the tradename P84 from HP Polymers GmbH) was added and it was dissolved in the suspension after stirring for 2 hours. Finally, 5.0 g of P84 polymer was added and it was dissolved in the suspension after stirring for 3 hours to form a stabilized concentrated suspension containing 30 wt-% of uniformly dispersed PES stabilized AlPO-14 molecular sieves (weight ratio of AlPO-14 to P84 and PES is 30:100; weight ratio of PES to P84 is 53.8:100) in the continuous P84-PES blend polymer matrix. The stabilized concentrated suspension was allowed to degas overnight.

A 30% AlPO-14/P84-PES mixed matrix film was cast on a non-woven fabric substrate from the bubble free stabilized concentrated suspension using a doctor knife with a 10-mil gap. The film together with the fabric substrate was gelled by immersing in a room temperature DI water bath for about 30 minutes, and then washed with 2-propanol for about 20 minutes to remove the residual solvents and the water. The resulting wet flat sheet asymmetric mixed matrix membrane was dried at about 70-80° C. in an oven to completely remove the solvents and the water. The dry 30% AlPO-14/P84-PES flat sheet asymmetric mixed matrix membrane was then coated with a thermally curable silicon rubber solution (RTV615A+B Silicon Rubber from GE Silicons) containing 27 wt-% RTV615A and 3 wt-% RTV615B catalyst and 70 wt-% cyclohexane solvent). The RTV615A+B coated membrane was cured at 85° C. for at least 2 h in an oven to form the final 30% AlPO-14/P84-PES flat sheet asymmetric mixed matrix membrane (abbreviated as Asymmetric 30% AlPO-14/P84-PES in Table 5).

Example 8

Preparation of "Control" 30% AlPO-14/P84-PES Flat Sheet Asymmetric Mixed Matrix Membrane Using Concentrated Suspension Containing Unstabilized AlPO-14 Molecular Sieve Particles 6.5 g of P84 polyimide polymer and 3.5 g of polyethersulfone (PES ULTRASON E6010 Natural from BASF) were dissolved in a mixture of 13.0 g of NMP and 27.0 g of 1,3-dioxolane by mechanical stirring. The mixture was stirred for 3 hours at room temperature to completely dissolve the polymers.

3.0 g of AlPO-14 molecular sieves were added to the P84-PES solution and the AlPO-14 particles were dispersed in the polymer solution by mechanical stirring for at least 8 hours to form a concentrated suspension containing 30 wt-% of unstabilized AlPO-14 molecular sieves (weight ratio of AlPO-14 to P84 and PES is 30:100; weight ratio of PES to P84 is 53.8:100) in the continuous P84-PES blend polymer matrix. The concentrated suspension was allowed to degas overnight.

A "control" 30% AlPO-14/P84-PES mixed matrix film was cast on a non-woven fabric substrate from the bubble free stabilized concentrated suspension using a doctor knife with a 10-mil gap. The film together with the fabric substrate was gelled by immersing in a room temperature DI water bath for about 30 min, and then washed with 2-propanol for about 20 min to remove the residual solvents and the water. The resulting wet flat sheet asymmetric mixed matrix membrane was dried at about 70° to 80° C. in an oven to completely remove the solvents and the water. The dry "control" 30% AlPO-14/P84-PES flat sheet asymmetric mixed matrix membrane was then coated with a thermally curable silicon rubber solution (RTV615A+B Silicon Rubber) containing 27 wt-% RTV615A and 3 wt-% RTV615B catalyst and 70 wt-% cyclohexane solvent). The RTV615A+B coated membrane was cured at 85° C. for at least 2 h in an oven to form the final "control" 30% AlPO-14/P84-PES flat sheet asymmetric mixed matrix membrane (abbreviated as "control" asymmetric 30% AlPO-14/P84-PES in Table 5).

Example 9

Permeation Properties of the "Control" P84-PES Blend Polymer Dense Film and 30% AlPO-14/P84-PES Mixed Matrix Dense Film The permeabilities ($P_{CO2}$, $P_{CH4}$, and $P_{H2}$) and selectivities ($\alpha_{CO2/CH4}$ and $\alpha_{H2/CH4}$) of the "control" P84-PES blend polymer dense film and 30% AlPO-14/P84-PES mixed matrix dense film were measured by pure gas measurements at 50° C. under about 690 kPa (100 psig) pressure using a dense film test unit. The results for $CO_2/CH_4$ and $H_2/CH_4$ separations are shown in Tables 1 and 2, respectively. It can be seen that the new 30% AlPO-14/P84-PES mixed matrix dense film containing P84 polyimide and low cost PES blend polymers and PES stabilized AlPO-14 molecular sieves showed 35% increase in $CO_2$ permeability and 18% increase in $CO_2/CH_4$ selectivity for $CO_2/CH_4$ separation compared to the "Control" P84-PES blend polymer dense film. In addition, the incorporation of 30 wt-% AlPO-14 molecular sieves into P84-PES blend polymer matrix increased $H_2$ permeability by 29% and $H_2/CH_4$ selectivity by 12%.

TABLE 1

Pure gas permeation test results of "Control" P84-PES blend polymer dense film and 30% AlPO-14/P84-PES mixed matrix dense film for $CO_2/CH_4$ separation[a]

| Dense film | $P_{CO2}$ (barrer) | $P_{CO2}$ increase (barrer) | $\alpha_{CO2/CH4}$ | $\alpha_{CO2/CH4}$ increase |
|---|---|---|---|---|
| "Control" P84-PES | 2.71 | — | 33.7 | — |
| 30% AlPO-14/P84-PES | 3.67 | 35% | 39.8 | 18% |

[a]Tested at 50° C. under 690 kPa (100 psig) pure gas pressure.

TABLE 2

Pure gas permeation test results of "Control" P84-PES blend polymer dense film and 30% AlPO-14/P84-PES mixed matrix dense film for $H_2/CH_4$ separation[a]

| Dense film | $P_{H2}$ (barrer) | $P_{H2}$ increase (barrer) | $\alpha_{H2/CH4}$ | $\alpha_{H2/CH4}$ increase |
|---|---|---|---|---|
| "Control" P84-PES | 11.8 | — | 146.6 | — |
| 30% AlPO-14/P84-PES | 15.2 | 29% | 164.5 | 12% |

[a]Tested at 50° C. under 690 kPa (100 psig) pure gas pressure.

Example 10

Permeation Properties of the "Control" Matrimid-PES Blend Polymer Dense Film and Molecular Sieve/Matrimid-PES Mixed Matrix Dense Films The permeabilities ($P_{CO2}$, $P_{CH4}$, and $P_{H2}$) and selectivities ($\alpha_{CO2/CH4}$ and $\alpha_{H2/CH4}$) of the "control" Matrimid-PES blend polymer dense film and 30% AlPO-14/Matrimid-PES and 30% SAPO-34/Matrimid-PES mixed matrix dense films were measured by pure gas measurements at 50° C. under about 690 kpa (100 psig) pressure using a dense film test unit. The results for $CO_2/CH_4$ and $H_2/CH_4$ separations are shown in Tables 3 and 4, respectively. It can be seen from Tables 3 and 4 that the new 30% AlPO-14/Matrimid-PES mixed matrix dense film containing Matrimid polyimide and low cost PES blend polymer matrix and PES stabilized AlPO-14 dispersed molecular sieve particles (AlPO-14/Matrimid-PES=30 wt-%) showed >20% increase in $CO_2/CH_4$ selectivity without significant loss in $CO_2$ permeability for $CO_2/CH_4$ separation ($P_{CO2}$=6.56 barrers, $\alpha_{CO2/CH4}$=30.5) and 45% increase in $H_2/CH_4$ selectivity without loss in $H_2$ permeability for $H_2/CH_4$ separation ($P_{H2}$=21.9 barrers, $\alpha_{H2/CH4}$=101.7) compared to the "Control" Matrimid-PES (12:8 weight ratio) blend dense film ($P_{CO2}$=7.16 barrers, $\alpha_{CO2/CH4}$=25.1; $P_{H2}$=19.9 barrers, $\alpha_{H2/CH4}$=70.0). 30% SAPO-34/Matrimid-PES mixed matrix dense film containing the same blend polymer matrix and PES stabilized SAPO-34 dispersed molecular sieve particles showed >90% increase in $CO_2$ and $H_2$ permeabilities without loss in $CO_2/CH_4$ and $H_2/CH_4$ selectivities.

TABLE 3

Pure gas permeation test results of "Control" Matrimid-PES blend polymer dense film and molecular sieve/Matrimid-PES mixed matrix dense films for $CO_2/CH_4$ separation[a]

| Dense film | $P_{CO2}$ (barrer) | $P_{CO2}$ increase (barrer) | $\alpha_{CO2/CH4}$ | $\alpha_{CO2/CH4}$ increase |
|---|---|---|---|---|
| "Control" Matrimid-PES | 7.16 | — | 25.1 | — |
| 30% AlPO-14/Matrimid-PES | 6.56 | −8% | 30.5 | 22% |
| 30% SAPO-34/Matrimid-PES | 13.9 | 94% | 25.0 | 0 |

[a]Tested at 50° C. under 690 kPa (100 psig) pure gas pressure.

TABLE 4

Pure gas permeation test results of "Control" Matrimid-PES blend polymer dense film and molecular sieve/Matrimid-PES mixed matrix dense films for $H_2/CH_4$ separation[a]

| Dense film | $P_{H2}$ (barrer) | $P_{H2}$ increase (barrer) | $\alpha_{H2/CH4}$ | $\alpha_{H2/CH4}$ increase |
|---|---|---|---|---|
| "Control" Matrimid-PES | 19.9 | — | 70.0 | — |
| 30% AlPO-14/Matrimid-PES | 21.9 | 10% | 101.7 | 45% |
| 30% SAPO-34/Matrimid-PES | 38.6 | 94% | 69.5 | 0 |

[a]Tested at 50° C. under 690 kPa (100 psig) pure gas pressure.

Example 11

Permeation Properties of the "Control" P84-PES Flat Sheet Asymmetric Blend Polymer Membrane, "Control" 30% AlPO-14/P84-PES Flat Sheet Asymmetric Mixed Matrix Membranes and 30% AlPO-14/P84-PES Flat Sheet Asymmetric Mixed Matrix Membranes The $CO_2$ and $CH_4$ permeabilities and $CO_2/CH_4$ selectivities of the "Control" P84-PES flat sheet asymmetric blend polymer membrane, "Control" 30% AlPO-14/P84-PES flat sheet asymmetric mixed matrix membranes and 30% AlPO-14/P84-PES flat sheet asymmetric mixed matrix membranes were determined from pure gas measurements at room temperature under 690 kPa (100 psig) pure gas pressure using asymmetric membrane test equipment. Table 5 summarizes the testing results.

Pure gas permeation test results shown in Table 5 demonstrated that the RTV615A+B silicon rubber coated asymmetric 30% AlPO-14/P84-PES mixed matrix membranes fabricated from concentrated suspension containing PES stabilized AlPO-14 molecular sieve particles showed much higher $CO_2/CH_4$ selectivity (>15%) than the "control" RTV615A+B silicon rubber coated asymmetric P84-PES blend polymer membranes. It is also worth noting that the "Control" 30% AlPO-14/P84-PES flat sheet asymmetric mixed matrix membranes prepared from concentrated suspension containing unstabilized AlPO-14 molecular sieve particles showed $CO_2/CH_4$ selectivity <10, indicating the existence of major voids and defects on the top dense layer which cannot be effectively plugged by RTV615A+B silicon rubber. These results demonstrated that the asymmetric mixed matrix membranes fabricated by the novel method described in the current invention exhibited simultaneously enhanced $CO_2/CH_4$ selectivity and $CO_2$ permeation rate over the polymer membranes prepared from the polymer matrix and over those prepared from suspensions containing the same polymer matrix and same molecular sieves but without polymer stabilization.

TABLE 5

Pure gas permeation test results of "Control" P84-PES flat sheet asymmetric blend polymer membrane and molecular sieve/P84-PES flat sheet asymmetric mixed matrix membranes[a]

| Asymmetric membrane | Permeation Rate (P/l) | | Selectivity ($\alpha_{CO2/CH4}$) |
|---|---|---|---|
| | $CO_2$ (A.U.) | $CH_4$ (A.U.) | |
| Asymmetric P84-PES | 0.69 | 0.026 | 26.6 |
| Asymmetric P84-PES (repeat) | 0.57 | 0.023 | 24.8 |
| "Control" asymmetric 30% AlPO-14/P84-PES | 3.15 | 1.62 | 1.94 |
| "Control" asymmetric 30% AlPO-14/P84-PES (repeat) | 2.32 | 0.45 | 5.16 |
| Asymmetric 30% AlPO-14/P84-PES | 0.81 | 0.021 | 38.6 |
| Asymmetric 30% AlPO-14/P84-PES (repeat) | 1.32 | 0.041 | 32.2 |

[a]Tested at room temperature (25° C.) under 690 kPa (100 psig) pure gas pressure. 1 A.U. = 1 ft³ (STP)/h · ft² · 690 kPa (100 psi)

Example 12

Preparation of the "Control" poly(DSDA-TMMDA)-PES Blend Polymer Dense Film 7.2 g of poly(DSDA-TMMDA) polyimide polymer and 0.8 g of polyethersulfone (PES) were dissolved in a mixture of 14.0 g of NMP and 20.6 g of 1,3-dioxolane by mechanical stirring. The mixture was mechanically stirred for 3 h to form a homogeneous casting dope. The resulting homogeneous casting dope was allowed to degas overnight. A "control" poly(DSDA-TMMDA)-PES blend polymer dense film was prepared from the bubble free casting dope on a clean glass plate using a doctor knife with a 20-mil gap. The dense film together with the glass plate was then put into a vacuum oven. The solvents were removed by slowly increasing the vacuum and the temperature of the vacuum oven. Finally, the dense film was dried at 200° C. under vacuum for at least 48 h to completely remove the residual solvents to form the "control" poly(DSDA-TMMDA)-PES blend polymer dense film (abbreviated as "control" poly(DSDA-TMMDA)-PES in Table 6).

Example 13

Preparation of 30% AlPO-14/poly(DSDA-TMMDA)-PES Mixed Matrix Dense Film 2.4 g of AlPO-14 molecular sieves were dispersed in a mixture of 16.0 g of NMP and 20.6 g of 1,3-dioxolane by mechanical stirring and ultrasonication to form a slurry. The slurry was stirred for 1 h and then 0.6 g of polyethersulfone (PES) was added to stabilize AlPO-14 molecular sieves in the slurry. The slurry was stirred for another 1 h to completely dissolve PES polymer and then 0.2 g of PES as one part of the continuous polymer matrix was added. The mixture was further stirred for 1 h to completely dissolve PES polymer and form a stabilized suspension. After that, 1.5 g of poly(DSDA-TMMDA) polyimide polymer was added and it was dissolved in the suspension after stirring for 1 h. Finally, 5.7 g of poly(DSDA-TMMDA) was added to the suspension. The mixture was mechanically stirred for another 2 h to form a stabilized concentrated suspension containing 30 wt % of uniformly dispersed PES stabilized AlPO-14 molecular sieves (weight ratio of AlPO-14 to poly(DSDA-TMMDA) and PES is 30:100; weight ratio of PES to poly(DSDA-TMMDA) is 11.1:100) in the continuous poly(DSDA-TMMDA)-PES blend polymer matrix. The stabilized concentrated suspension was allowed to degas overnight.

A 30% AlPO-14/poly(DSDA-TMMDA)-PES mixed matrix dense film was prepared on a clean glass plate from the bubble free stabilized concentrated suspension using a doctor knife with a 20-mil gap. The film together with the glass plate was then put into a vacuum oven. The solvents were removed by slowly increasing the vacuum and the temperature of the vacuum oven. Finally, the dense film was dried at 200° C. under vacuum for at least 48 h to completely remove the residual solvents to form 30% AlPO-14/poly(DSDA-TMMDA)-PES mixed matrix dense film (abbreviated as 30% AlPO-14/poly(DSDA-TMMDA)-PES in Table 6).

Example 14

Permeation Properties of the "Control" poly(DSDA-TMMDA)-PES Blend Polymer Dense Film and 30% AlPO-14/poly(DSDA-TMMDA)-PES Mixed Matrix Dense Film The permeabilities ($P_{CO2}$ and $P_{CH4}$) and selectivity ($\alpha_{CO2/CH4}$) of the "control" poly(DSDA-TMMDA)-PES blend polymer dense film and 30% AlPO-14/poly(DSDA-TMMDA)-PES mixed matrix dense film were measured by pure gas measurements at 50° C. under about 690 kPa (100 psig) pressure using a dense film test unit. The results for $CO_2/CH_4$ separation are shown in Table 6. It can be seen from Table 6 that the new 30% AlPO-14/poly(DSDA-TMMDA)-PES mixed matrix dense film containing poly(DSDA-TMMDA) polyimide and low cost PES blend polymer matrix and PES stabilized AlPO-14 dispersed molecular sieve particles (AlPO-14/poly(DSDA-TMMDA)-PES=30 wt %) showed $CO_2/CH_4$ selectivity increase by 28% and simultaneous $CO_2$ permeability increase by 40% for $CO_2/CH_4$ separation ($P_{CO2}$=25.9 barrers, $\alpha_{CO2/CH4}$=31.8) compared to the "Control" poly(DSDA-TMMDA)-PES (12:8 weight ratio) blend dense film ($P_{CO2}$=18.5 barrers, $\alpha_{CO2/CH4}$=24.8).

TABLE 6

Pure gas permeation test results of "Control" poly(DSDA-TMMDA)-PES blend polymer dense film and 30% AlPO-14/poly(DSDA-TMMDA)-PES mixed matrix dense film for $CO_2/CH_4$ separation[a]

| Dense film | $P_{CO2}$ (barrer) | $P_{CO2}$ increase (barrer) | $\alpha_{CO2/CH4}$ | $\alpha_{CO2/CH4}$ increase |
|---|---|---|---|---|
| "Control" poly(DSDA-TMMDA)-PES | 18.5 | — | 24.8 | — |
| 30% AlPO-14/poly(DSDA-TMMDA)-PES | 25.9 | 40% | 31.8 | 28% |

[a]Tested at 50° C. under 690 kPa (100 psig) pure gas pressure.

Example 15

Preparation of the "Control" poly(DSDA-PMDA-TMMDA)-PES Blend Polymer Dense Film 4.0 g of poly(DSDA-PMDA-TMMDA) polyimide polymer and 4.0 g of polyethersulfone (PES) were dissolved in a mixture of 14.0 g of NMP and 20.6 g of 1,3-dioxolane by mechanical stirring. The mixture was stirred for 3 h to form a homogeneous casting dope. The resulting homogeneous casting dope was allowed to degas overnight. A "control" poly(DSDA-PMDA-TMMDA)-PES blend polymer dense film was prepared from the bubble free casting dope on a clean glass plate using a doctor knife with a 20-mil gap. The dense film together with the glass plate was then put into a vacuum oven. The solvents were removed by slowly increasing the vacuum and the temperature of the vacuum oven. Finally, the dense film was dried at 200° C. under vacuum for at least 48 h to completely remove the residual solvents to form the "control" poly(DSDA-PMDA-TMMDA)-PES blend polymer dense film (abbreviated as "control" poly(DSDA-PMDA-TMMDA)-PES in Table 7).

Example 16

Preparation of 30% AlPO-14/poly(DSDA-PMDA-TMMDA)-PES Mixed Matrix Dense Film 2.4 g of AlPO-14 molecular sieves were dispersed in a mixture of 16.0 g of NMP and 20.6 g of 1,3-dioxolane by mechanical stirring and ultrasonication to form a slurry. The slurry was stirred for 1 h and then 0.6 g of polyethersulfone (PES) was added to stabilize AlPO-14 molecular sieves in the slurry. The slurry was stirred for another 1 h to completely dissolve PES polymer and then 4.0 g of poly(DSDA-PMDA-TMMDA) as one part of the continuous polymer matrix was added. The mixture was further stirred for 1 h to completely dissolve poly(DSDA-PMDA-TMMDA) polymer. After that, 3.4 g of PES as another part of the continuous polymer matrix was added to the suspension. The mixture was mechanically stirred for another 2 h to form a stabilized concentrated suspension containing 30 wt % of uniformly dispersed PES stabilized AlPO-14 molecular sieves (weight ratio of AlPO-14 to poly(DSDA-PMDA-TMMDA) and PES is 30:100; weight ratio of PES to poly(DSDA-PMDA-TMMDA) is 100:100) in the continuous poly(DSDA-PMDA-TMMDA)-PES blend polymer matrix. The stabilized concentrated suspension was allowed to degas overnight.

A 30% AlPO-14/poly(DSDA-PMDA-TMMDA)-PES mixed matrix dense film was prepared on a clean glass plate from the bubble free stabilized concentrated suspension using a doctor knife with a 20-mil gap. The film together with the glass plate was then put into a vacuum oven. The solvents were removed by slowly increasing the vacuum and the temperature of the vacuum oven. Finally, the dense film was dried at 200° C. under vacuum for at least 48 h to completely remove the residual solvents to form 30% AlPO-14/poly(DSDA-PMDA-TMMDA)-PES mixed matrix dense film (abbreviated as 30% AlPO-14/poly(DSDA-PMDA-TMMDA)-PES in Table 7).

Example 17

Preparation of 30% AlPO-18/poly(DSDA-PMDA-TMMDA)-PES Mixed Matrix Dense Film 2.4 g of AlPO-18 molecular sieves were dispersed in a mixture of 16.0 g of NMP and 20.6 g of 1,3-dioxolane by mechanical stirring and ultrasonication to form a slurry. The slurry was stirred for 1 h and then 0.6 g of polyethersulfone (PES) was added to stabilize AlPO-18 molecular sieves in the slurry. The slurry was stirred for another 1 h to completely dissolve PES polymer and then 4.0 g of poly(DSDA-PMDA-TMMDA) as one part of the continuous polymer matrix was added. The mixture was further stirred for 1 h to completely dissolve poly(DSDA-PMDA-TMMDA) polymer. After that, 3.4 g of PES as another part of the continuous polymer matrix was added to the suspension. The mixture was mechanically stirred for another 2 h to form a stabilized concentrated suspension containing 30 wt % of uniformly dispersed PES stabilized AlPO-18 molecular sieves (weight ratio of AlPO-18 to poly(DSDA-PMDA-TMMDA) and PES is 30:100; weight ratio of PES to poly(DSDA-PMDA-TMMDA) is 100:100) in the continuous poly(DSDA-PMDA-TMMDA)-PES blend polymer matrix. The stabilized concentrated suspension was allowed to degas overnight.

A 30% AlPO-18/poly(DSDA-PMDA-TMMDA)-PES mixed matrix dense film was prepared on a clean glass plate from the bubble free stabilized concentrated suspension using a doctor knife with a 20-mil gap. The film together with the glass plate was then put into a vacuum oven. The solvents were removed by slowly increasing the vacuum and the temperature of the vacuum oven. Finally, the dense film was dried at 200° C. under vacuum for at least 48 h to completely remove the residual solvents to form 30% AlPO-18/poly(DSDA-PMDA-TMMDA)-PES mixed matrix dense film (abbreviated as 30% AlPO-18/poly(DSDA-PMDA-TMMDA)-PES in Table 7).

Example 18

Permeation Properties of the "Control" poly(DSDA-PMDA-TMMDA)-PES Blend Polymer Dense Film and Molecular Sieve/Poly(DSDA-PMDA-TMMDA)-PES Mixed Matrix Dense Films The permeabilities ($P_{CO2}$ and $P_{CH4}$) and selectivity ($\alpha_{CO2/CH4}$) of the "control" poly(DSDA-PMMDA-TMMDA)-PES blend polymer dense film, 30% AlPO-14/poly(DSDA-PMDA-TMMDA)-PES, and 30% AlPO-18/poly(DSDA-PMDA-TMMDA)-PES mixed matrix dense films were measured by pure gas measurements at 50° C. under about 690 kPa (100 psig) pressure using a dense film test unit. The results for CO$_2$/CH$_4$ separation are shown in Table 7. It can be seen from Table 7 that the new 30% AlPO-14/poly(DSDA-PMDA-TMMDA)-PES mixed matrix dense film containing poly(DSDA-PMDA-TMMDA) polyimide and low cost PES blend polymer matrix and PES stabilized AlPO-14 dispersed molecular sieve particles (AlPO-14/poly(DSDA-PMDA-TMMDA)-PES=30 wt %) showed CO$_2$/CH$_4$ selectivity increase by 24% and simultaneous CO$_2$ permeability increase by 39% for CO$_2$/CH$_4$ separation (P$_{CO2}$=15.8 barrers, $\alpha_{CO2/CH4}$=20.0) compared to the "Control" poly(DSDA-PMDA-TMMDA)-PES (1:1 weight ratio) blend dense film (P$_{CO2}$=11.4 barrers, $\alpha_{CO2/CH4}$=16.1). Additionally, it can be seen from Table 7 that the new 30% AlPO-18/poly(DSDA-PMDA-TMMDA)-PES mixed matrix dense film containing poly(DSDA-PMDA-TMMDA) polyimide and low cost PES blend polymer matrix and PES stabilized AlPO-18 dispersed molecular sieve particles (AlPO-18/poly(DSDA-PMDA-TMMDA)-PES=30 wt %) showed significant CO$_2$/CH$_4$ selectivity increase by 56% and simultaneous dramatic CO$_2$ permeability increase by 148% for CO$_2$/CH$_4$ separation (P$_{CO2}$=28.3 barrers, $\alpha_{CO2/CH4}$=25.1) compared to the "Control" poly(DSDA-PMDA-TMMDA)-PES (1:1 weight ratio) blend dense film (P$_{CO2}$=11.4 barrers, $\alpha_{CO2/CH4}$=16.1).

TABLE 7

Pure gas permeation test results of "Control" poly(DSDA-PMDA-TMMDA)-PES blend polymer dense film and molecular sieve/poly(DSDA-PMDA-TMMDA)-PES mixed matrix dense films for CO$_2$/CH$_4$ separation[a]

| Dense film | P$_{CO2}$ (barrer) | P$_{CO2}$ increase (barrer) | $\alpha_{CO2/CH4}$ | $\alpha_{CO2/CH4}$ increase |
|---|---|---|---|---|
| "Control" poly(DSDA-PMDA-TMMDA)-PES | 11.4 | — | 16.1 | — |
| 30% AlPO-14/poly(DSDA-PMDA-TMMDA)-PES | 15.8 | 39% | 20.0 | 24% |
| 30% AlPO-18/poly(DSDA-PMDA-TMMDA)-PES | 28.3 | 148% | 25.1 | 56% |

[a]Tested at 50° C. under 690 kPa (100 psig) pure gas pressure.

What is claimed is:

1. A process for separating at least one gas from a mixture of gases comprising:
   a) providing a mixed matrix gas separation membrane comprising a polymer stabilized molecular sieves approximately uniformly dispersed in a continuous polymer matrix phase comprising at least two different polymers wherein said continuous polymer matrix is permeable to at least one gas in said mixture of gases wherein said polymer stabilized molecular sieves are stabilized by at least one polymer selected from the group consisting of polyethersulfones, sulfonated polyethersulfones, polyethers, polyether ketones, poly(ethylene imine)s, poly(amidoamine)s, polyetherimides cellulose acetate, cellulose triacetate, cellulose acetate-butyrate, cellulose propionate, ethyl cellulose, methyl cellulose, nitrocellulose, and then said polymer stabilized molecular sieves are dispersed in said continuous polymer matrix phase;
   b) contacting the mixture of gases on one side of the mixed matrix gas separation membrane to cause said at least one gas to permeate the mixed matrix gas separation membrane; and
   c) removing from a side opposite to said one side of the mixed matrix gas separation membrane a permeate gas composition comprising a portion of said at least one gas which has permeated said mixed matrix gas separation membrane.

2. The process of claim 1 wherein said mixture of gases is selected from the group consisting of CO$_2$/CH$_4$, H$_2$/CH$_4$, H$_2$/N$_2$, O$_2$/N$_2$, CO$_2$/N$_2$, helium/methane, argon/ammonia, olefin/paraffin, and iso/normal paraffins.

3. The process of claim 1 wherein said mixture of gases comprises methane and at least one gas selected from the group consisting of carbon dioxide, oxygen, nitrogen, water vapor, hydrogen sulfide and helium.

4. The process of claim 1 wherein said mixture of gases comprises a mixture of air and volatile organic compounds.

5. The process of claim 1 wherein said molecular sieves are selected from the group consisting of nano-molecular sieves, microporous molecular sieves, mesoporous molecular sieves, carbon molecular sieves and porous metal-organic frameworks.

6. The process of claim 1 wherein said at least two different polymers are selected from the group consisting of polysulfones, sulfonated polysulfones; polyethersulfones, sulfonated polyethersulfones, polyethers, polyetherimides; poly(styrenes), acrylonitrilestyrene copolymers, styrene-butadiene copolymers and styrene-vinylbenzylhalide copolymers; polycarbonates, cellulose acetate, cellulose propionate, ethyl cellulose, methyl cellulose, and nitrocellulose; polyamides; polyimides; polyamide/imides; polyketones, polyether ketones; poly(arylene oxides); poly(phenylene oxide) and poly(xylene oxide); poly(esteramide-diisocyanate); polyurethanes; polyesters; polysulfides; poly(ethylene), poly(propylene), poly(butene-1), poly(4-methyl pentene-1), poly(vinyl chloride), poly(vinyl fluoride), poly(vinylidene chloride), poly(vinylidene fluoride), poly(vinyl esters); poly(vinyl acetate); poly(vinyl propionate), poly(vinyl pyridines), poly(vinyl pyrrolidones), poly(vinyl ethers), poly(vinyl ketones), poly(vinyl aldehydes); poly(vinyl formal); poly(vinyl butyral); poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; and grafts and blends of said polymers.

7. The process of claim 1 wherein said at least two different polymers are selected from the group consisting of polysulfones, sulfonated polysulfones, polyethersulfones (PESs), sulfonated PESs, polyethers, polyetherimides, cellulose acetate, cellulose triacetate, polyamides, polyimides, poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)), poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) (poly(BTDA-PMDA-ODPA-TMMDA)), poly(3,3',4,4'-diphenylsulfone tetracarboxylic dianhydride-3,3',5,5'-tetramethyl-4,4'-methylene dianiline) (poly(DSDA-TMMDA)), poly(3,3',4,4'-benzophenone tetracarboxylic dianhydride-3,3',5,5'-tetramethyl-4,4'-methylene dianiline) (poly(BTDA-MMDA)), poly(3,3',4,4'-diphenylsulfone tetracarboxylic dianhydride-pyromellitic dianhydride-3,3',5,5'-tetramethyl-4,4'-methylene dianiline) (poly(DSDA-PMDA-TMMDA)), poly[2,2'-bis-(3,4-dicarboxyphenyl)hexafluoropropane dianhydride-1,3-phenylenediamine] (poly(6FDA-m-PDA)), poly[2,2'-bis-(3,4-dicarboxyphenyl)hexafluoropropane dianhydride-1,3-phenylenediamine-3,5-diaminobenzoic acid)] (poly(6FDA-m-PDA-DABA)); polyamide/imides mixtures; polyketones and polyether ketones.

8. The process of claim 1 wherein said polymer in said polymer stabilized molecular sieve is the same as one of said at least two different polymers in said polymer matrix.

9. The process of claim 1 wherein said polymer in said polymer stabilized molecular sieve is different from either of said at least two different polymers in said polymer matrix.

10. The process of claim 1 wherein said mixed matrix membrane is a dense film mixed matrix membrane or an asymmetric flat sheet or hollow fiber mixed matrix membrane.

11. The process of claim 5 wherein said nano-molecular sieves comprise particles between 5 to 1000 nm in size wherein said nano-molecular sieves are selected from the group consisting of silicalite-1, SAPO-34, Si-MTW, Si-BEA, Si-MEL, LTA, FAU, Si-DDR, AlPO-14, AlPO-34, AlPO-18, SSZ-62, UZM-5, UZM-9, UZM-13, UZM-17, UZM-19, and MCM-65.

12. The process of claim 5 wherein said microporous molecular sieves are selected from the group consisting of zeolites, nonzeolitic aluminophosphates, nonzeolitic silicoaluminophosphates, nonzeolitic metalloaluminophosphates and nonzeolitic metallosilicoaluminophosphates.

* * * * *